United States Patent [19]

Shen et al.

[11] Patent Number: 5,789,871
[45] Date of Patent: Aug. 4, 1998

[54] SERIES-CAPACITOR ELECTRONIC BALLAST

[75] Inventors: Eric Bertrand Shen, Franklin Lakes, N.J.; Martin Frederick Schlecht, Lexington, Mass.

[73] Assignee: Massachusetts Institute of Technology, Cambridge, Mass.

[21] Appl. No.: 890,460

[22] Filed: Jul. 9, 1997

[51] Int. Cl.[6] .................................................. H05B 37/02
[52] U.S. Cl. ..................... 315/291; 315/307; 315/DIG. 5
[58] Field of Search .................................... 315/291, 307, 315/308, 224, 209 R, DIG. 5, DIG. 7, 219, 244, 311, 310

[56] References Cited

U.S. PATENT DOCUMENTS 4,734,624  3/1988  Nagase et al. ............................ 315/243

OTHER PUBLICATIONS

"Principles of Power Electronics" by John G. Kassakian et al, pp. 268–269, Addison–Wesley Publishing Company, 1991.

Primary Examiner—Robert Pascal
Assistant Examiner—David H. Vu
Attorney, Agent, or Firm—Robert J. Kraus

[57] ABSTRACT

An electronic ballast for a discharge lamp includes a capacitive storage device which is serially connected with an AC power source and the lamp. A first combination of switches, arranged in a bridge configuration, alternately reverse the polarity in which the capacitive storage device is connected. A second combination of switches periodically bypasses the capacitive storage device and momentarily places the AC power source directly in series with the lamp.

8 Claims, 6 Drawing Sheets

SERIES-CAPACITOR ELECTRONIC BALLAST

BACKGROUND OF THE INVENTION

1. Field of the Invention

The invention relates to ballasts for lamps and, in particular, to electronic ballasts for discharge lamps.

2. Description of Related Art

It has been estimated that over 25% of all electrical energy consumed in the world is utilized to power artificial lighting. Thus, the importance of efficient electrical lighting sources cannot be understated.

The most efficient electrical lighting sources, that are commonly available, are gaseous low-pressure and high-pressure discharge lamps, e.g. fluorescent and high-intensity-discharge (HID) lamps, respectively. These types of lamps typically have a negative-resistance characteristic and are driven by current-limiting circuits known as ballasts.

Two general types of lamp ballasts, i.e. electromagnetic and electronic, are in common usage for driving discharge lamps. Electromagnetic ballasts have only passive circuit components and typically drive lamps at power-line frequencies. Electronic ballasts include both passive and active circuit components and typically drive lamps at frequencies much higher than power line frequencies. Generally, the electromagnetic ballast is less expensive. However, the electronic ballast is smaller and lighter, operates discharge lamps more efficiently, with less audible noise and with no visible flicker, and contributes to a longer lamp life. Additionally, electronic ballasts can regulate discharge-lamp power more effectively than electromagnetic ballasts in response to changing power-line and lamp-operating conditions.

FIG. 1 schematically illustrates a typical electronic ballast for driving a discharge lamp L from an AC voltage $v_{ac}$ provided by a power source PS, such as power lines from a local utility. The ballast includes an electromagnetic interference filter EMI, a full-wave rectifier bridge BR, a power-factor correction circuit, an energy-storage capacitor $C_e$, and a half-bridge resonant inverter, all electrically connected in series between the power source and the lamp L.

The filter EMI prevents electromagnetic interference generated by the ballast circuitry and the discharge lamp from being conducted back to the power source. The ballast generates EMI in the form of high harmonic currents which, if conducted back to the power source, could cause problems such as excessive neutral currents, overheated transformers, and interference with any sensitive electronic equipment which also receives electrical energy from the power source. Discharge lamps can generate both electromagnetic and radio-frequency interference.

The power-factor correction circuit is a well-known boost-converter type, including an inductor $L_{10}$, a switching transistor $Q_{10}$ and a diode $D_{10}$. It functions to increase the power factor at the AC power source and to boost the DC voltage provided to the energy-storage capacitor $C_e$ by the bridge BR.

The energy-storage capacitor $C_e$ performs two functions. First, it acts as a DC voltage source for the resonant inverter. Second, it balances the energy flow between the load and the power source. When the AC power source PS is instantaneously supplying less power than the load is consuming, $C_e$ must deliver energy to the load. Conversely, when the AC power source is instantaneously supplying more power than the load is consuming, $C_e$ must store energy.

The resonant inverter output stage converts the DC voltage on the energy storage capacitor $C_e$ to a high frequency sinusoidal drive for the lamp L. Two transistor switches $Q_{11}$ and $Q_{12}$ are electrically connected in a half-bridge configuration and operate at a 50% duty cycle to chop the DC voltage into a high-frequency square wave. A capacitor $C_b$ is provided for blocking DC components from reaching a transformer T, which is provided for both isolation and impedance matching. An inductor $L_f$ and a capacitor $C_f$ form a second-order filter for filtering the high-frequency square wave so that a sinusoidal voltage and current, at the fundamental switching frequency, are applied to the discharge lamp L.

SUMMARY OF THE INVENTION

It is an object of the invention to provide an electronic ballast which optimizes the drive current for a discharge lamp to improve the radiation efficiency of the lamp. For maximum radiation efficiency, a constant DC drive current would be supplied. This is not practical, because a power-dissipating ballast resistor would be required. Also, in fluorescent lamps this would cause a unidirectional migration of ions in the discharge column and the light produced at one end of the lamp would be brighter than at the other. The sinusoidal AC current supplied by the prior art ballast of FIG. 1 is a compromise. It periodically reverses the polarity of the drive current to achieve uniform brightness along the length of the discharge column, but the magnitude of the drive current is never constant.

It is another object of the invention to provide an electronic ballast which is compact and which does not contribute to electromagnetic interference production by a discharge lamp. In the prior art ballast of FIG. 1, the size of the passive filter components in the resonant inverter can be reduced by increasing the operating frequency. However, increasing the operating frequency of the discharge lamp also increases electromagnetic interference energy radiated by the lamp.

It is yet another object of the invention to reduce the size of the energy storage capacitor required for a lamp ballast. The electronic ballast of FIG. 1 supplies full-wave rectified sinusoidal power to the capacitor $C_e$ at twice the power source frequency. At this relatively low frequency, the power supplied to the capacitor is well below peak amplitude for relatively long intervals. In order to provide low-ripple power to the resonant inverter, the capacitor $C_e$ must be physically large.

It is still another object of the invention to provide an electronic ballast which does not require the use of a transformer. The transformer utilized in an electronic ballast such as that shown in FIG. 1 not only increases the size and weight of the ballast, it also contributes to electrical losses in the ballast.

It is a further object of the invention to provide an electronic ballast which takes advantage of improvements in semiconductor technology. The electronic ballasts which are commonly available to the lighting industry do not take full advantage of the efficiencies in size, power consumption and cost that are increasingly possible by utilizing state-of-the-art integrated circuit technology, particularly in the power semiconductor field.

In accordance with the invention, an electronic ballast is provided for series electrical connection between a discharge lamp and a power source, supplying AC voltage and current at a predetermined frequency, to produce an instantaneously varying ballast voltage which, in combination with the AC voltage produced by the power source, supplies the lamp with an alternating square-wave voltage and current, having predetermined DC magnitudes, in synchronism with the AC power source voltage. The ballast comprises capacitive storage means, bridge switching means, and duty-cycle switching means.

The capacitive storage means alternately stores electrical energy when the AC power source is instantaneously supplying more power than the lamp is consuming and supplies energy when the lamp is instantaneously consuming more power than the AC power source is supplying.

The bridge switching means alternately connects the capacitive storage means in series opposition with the AC power source, when the instantaneous voltage supplied by the power source is higher than the predetermined square-wave voltage, and connects the capacitive storage means in series assistance with the AC power source, when the instantaneous voltage supplied by the power source is lower than the predetermined square-wave voltage.

The duty-cycle switching means bypasses the capacitive storage means and places the AC power source directly in series with the lamp during a fraction of each of successive periods occurring at a very high periodic rate relative to the predetermined power source operating frequency. The fraction of each period is determined to produce an average ballast voltage over the respective period which effects production of the predetermined DC voltage magnitude during the period. Over each half cycle of the power source operating frequency, the predetermined DC voltage magnitude at which the lamp is driven is made equal to the average magnitude of the AC voltage supplied by the power source. This results in zero net energy storage in the ballast, which is necessary for steady-state operation, and enables the size of the storage capacitor to be minimized.

The alternating DC drive voltage, and corresponding DC drive current, produced by the ballast maximizes radiation efficiency of the discharge lamp without the need for a power-dissipating resistor while avoiding the unidirectional ion migration that would occur in fluorescent lamps if driven with a unidirectional DC current.

By utilizing duty-cycle switching at a very high periodic rate while producing an alternating DC lamp driving voltage at a low frequency, the ballast can be made compact without increasing electromagnetic interference energy radiated by the lamp.

By providing a switching arrangement for intermittently connecting a storage capacitor in series with the power source and the discharge lamp, such that the storage capacitor combines with the power source in powering the lamp, rather than independently providing the full energy requirement of the lamp, the size of the storage capacitor may be much smaller than in prior art ballasts.

By producing the lamp drive power by utilizing the above described switching and capacitive storage means, the need for a cumbersome and lossy transformer is avoided.

Further, the switching means utilized in a ballast in accordance with the invention are especially suitable for construction with power integrated circuits.

DESCRIPTION OF THE PREFERRED EMBODIMENTS

Figure 2:
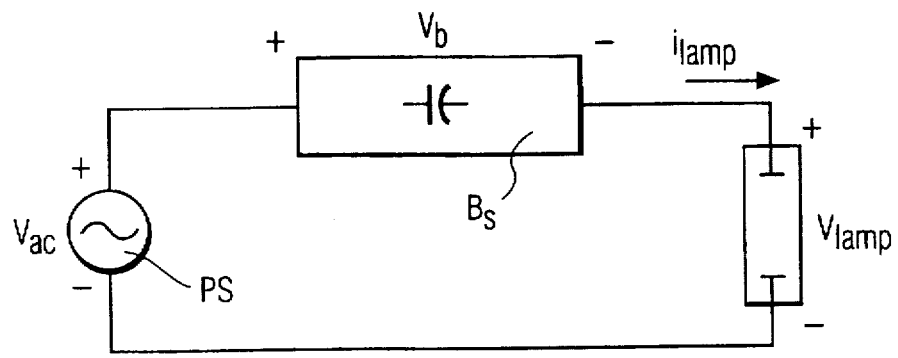
FIG. 2 is a schematic diagram of a discharge lamp system employing an electronic ballast in accordance with the invention.

FIG. 2 illustrates a discharge lamp system employing a series-capacitor ballast in accordance with the invention. As shown, the ballast $B_s$ is electrically connected in series with a discharge lamp L and an AC power source PS. The power source supplies sinusoidal electrical energy at a standard power utility frequency, e.g. 60 Hz. Note that the polarity symbols + and − indicate voltage polarities during positive half cycles of the power source voltage $v_{ac}$.

Figure 3A:
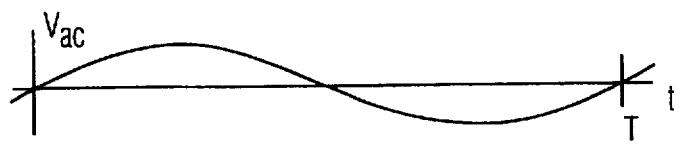
FIGS. 3a–3d are waveform diagrams illustrating operation of the system of FIG. 2.
Figure 3B:
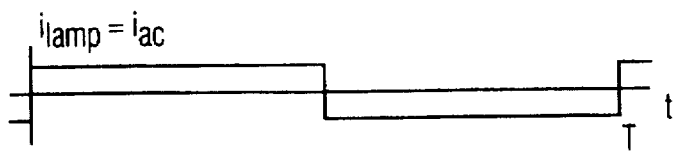
Figure 3C:
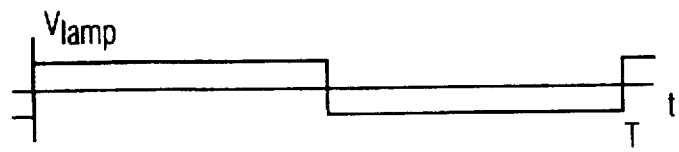
Figure 3D:
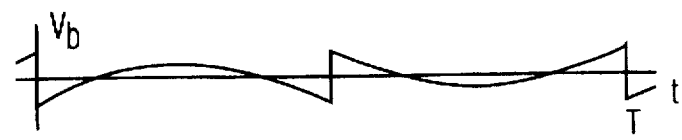

FIGS. 3a –3d illustrate operation of the ballast. The ballast functions to capacitively charge and discharge such that a sinusoidal source voltage $v_{ac}$ supplied by the power source PS is converted to a square-wave current $i_{lamp}$ and voltage $v_{lamp}$ for driving the discharge lamp L in synchronism with the source voltage. FIG. 3d shows the changing voltage $v_b$ across the ballast $B_s$ as it performs this charge-discharge function.

Thus, for each half cycle the lamp current and voltage remain at a constant DC value. Driving the discharge lamp with square-wave power yields a radiation efficiency which is equivalent to DC operation, which is significantly better than that obtainable with sinusoidal operation at the power source frequency.

FIG. 3d illustrates the concept of load-balancing energy storage. The voltage $v_b$ is both positive and negative over one-half cycle. Since the current is constant over a half cycle, the ballast is alternately storing and delivering energy. When power source PS is supplying less energy than that dissipated in the lamp, the ballast supplies energy to the lamp. Conversely, when the power source is supplying more energy than that dissipated in the lamp, the ballast stores the extra energy.

Figure 1:
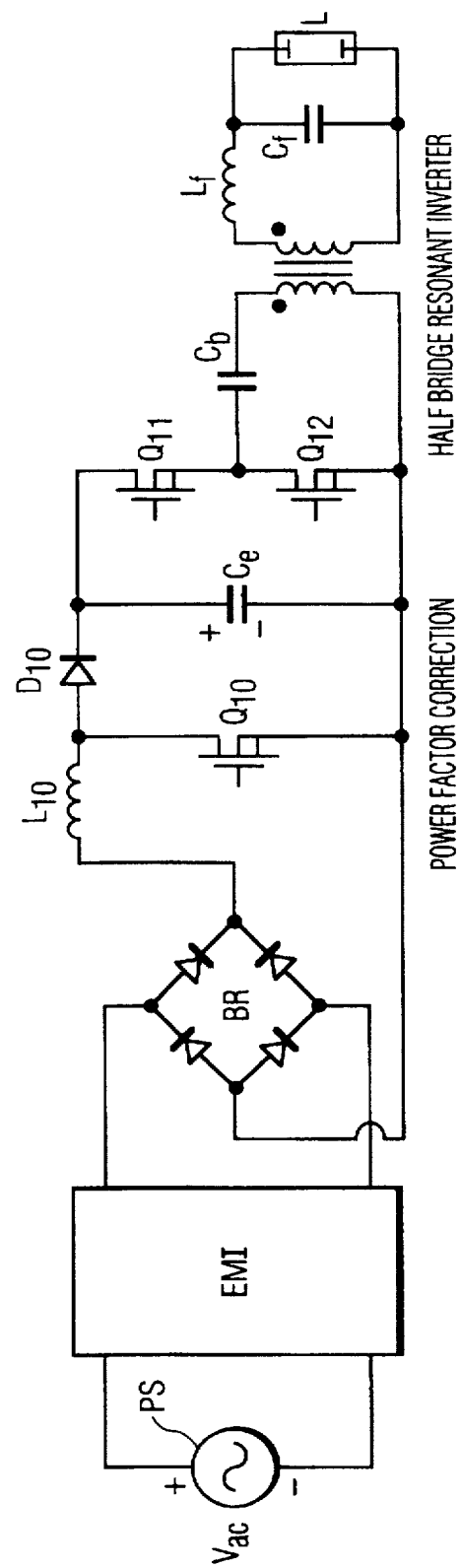
FIG. 1 schematic diagram of a prior art electronic ballast circuit.
Figures 4A, 4B, 4C:
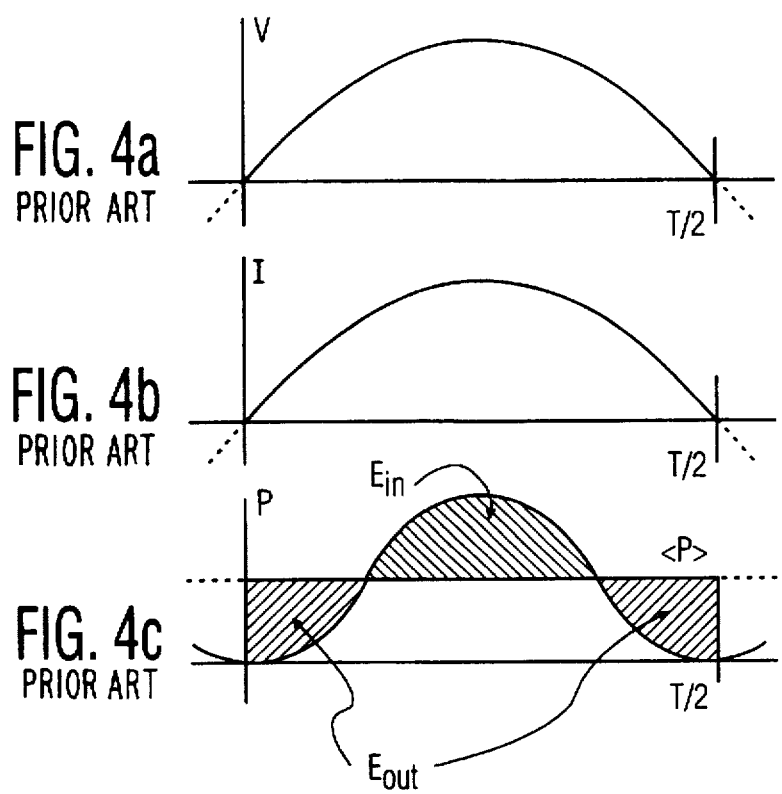
FIGS. 4a–4c are waveform diagrams illustrating energy storage requirements the electronic ballast of FIG. 1.

FIGS. 4a–4c illustrate the load-balancing energy requirements for the prior art electronic ballast of FIG. 1. FIGS. 4a and 4b show the power-factor-corrected voltage and current supplied by the power source PS to the ballast. FIG. 4c shows the minimum energy storage requirements that must be provided by the energy storage capacitor $C_e$ for load balancing. $E_{in}$ represents the energy that the prior art ballast must store in the capacitor when the power source is supplying more power than the discharge lamp is consuming. $E_{out}$ represents the energy that the ballast must supply to the lamp when the power source is supplying less energy than is being dissipated in the lamp. The energy $E_{in}$, which is equal to $E_{out}$, is the minimum energy storage requirement of the ballast. For this sinusoidal power-source current the minimum energy requirement $E_{min}(\sin)=P_O/\omega w$, where $P_O$ is the average power delivered by the power source and $\omega$ is the AC frequency of the power source PS. Typical prior art electronic ballasts store as much as eight-times this minimum energy requirement in the capacitor $C_e$, to minimize ripple in the voltage supplied to the resonant inverter.

Figure 4D:
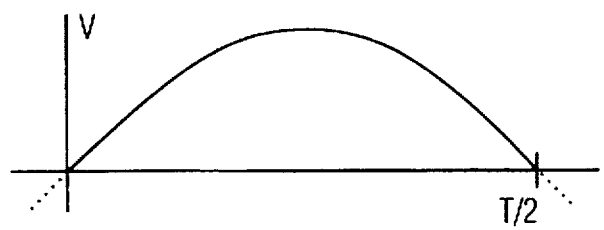
FIG. 4d–4f waveform diagrams illustrating energy storage requirements in the electronic ballast of FIG. 2.
Figure 4E:
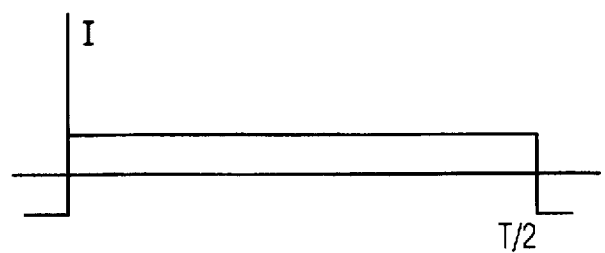
Figure 4F:
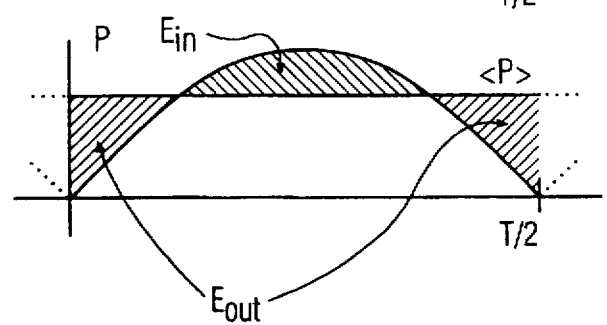

FIGS. 4d–4f illustrate the load-balancing energy requirements for the series-capacitor electronic ballast $B_s$ of FIG. 2. As shown in FIG. 4d, the voltage supplied by the power source PS to the ballast is identical to that of FIG. 4a. However, the current, shown in FIG. 4e, is the square-wave current shown in FIG. 3b, while the power curve in FIG. 4f has the same waveform as the ballast voltage $v_b$ shown in FIG. 3d. In FIG. 4f the minimum energy storage requirement $E_{min}$ is again represented by either $E_{in}$ or $E_{out}$, but for this square-wave drive current the minimum energy storage requirement $E_{min}(sq)=(0.66)P_o/\omega$. In other words, the minimum energy storage requirement for the series-capacitor ballast of FIG. 2 is approximately two-thirds of the minimum required for the prior art ballast of FIG. 1. Further, it is possible to operate the series-capacitor ballast at this minimum, which is even more significant in view of the fact that prior art resonant inverter ballasts must utilize capacitors that are sufficiently large to store several times the minimum energy $E_{min}(sin)$. The ballast is operated at the minimum energy storage requirement $E_{min}(sq)$ and at zero net storage in the capacitor $C_e$ by, during each half cycle:

producing that ballast voltage $v_b$ which results in the production of a square-wave lamp voltage $v_{lamp}$ having a magnitude equal to the average source voltage $v_{ac}$ for that half cycle (See FIGS. 3a, 3c, and 3d.); and completely discharging the capacitor $C_e$.

Figure 5:
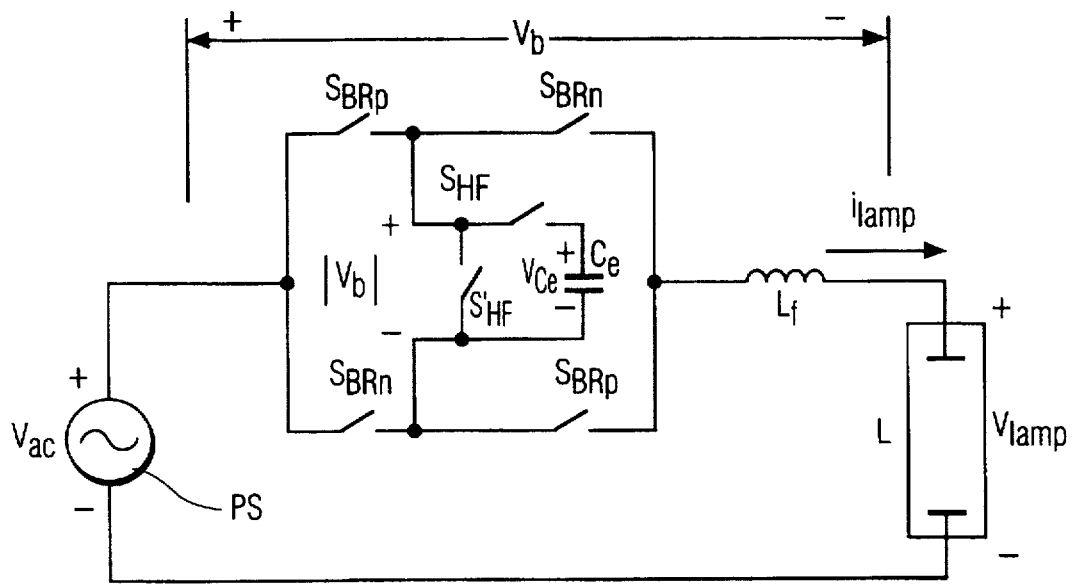
FIG. 5 is schematic diagram of a discharge lamp system incorporating a first embodiment of an electronic ballast in accordance with the invention.

FIG. 5 shows a lamp system including a first embodiment of the series-capacitor electronic ballast $B_s$. The ballast includes a charge-storage capacitor $C_e$, two positive-direction bridge switches, each labeled $S_{BRp}$, two negative-direction bridge switches, each labeled $S_{BRn}$, two high-frequency duty-cycle switches $S_{HF}$ and $S'_{HF}$, and a filter inductor $L_f$. All switches are indicated schematically and will be implemented in actual circuitry by solid state semiconductor switches, such as power MOSFETS.

The capacitor always charges in the polarity shown in FIG. 5. The four bridge switches are provided for periodically changing the direction in which the storage capacitor $C_e$ is connected in series with the power source and the lamp. The two positive-direction bridge switches $S_{BRp}$ operate together and, when closed, connect the capacitor in the polarity indicated in FIG. 2. This shall be referred to as the positive-polarity direction. The two negative-direction bridge switches $S_{BRn}$ also operate together and, when closed, connect the capacitor in a polarity opposite to that indicated in FIG. 2. This shall be referred to as the negative-polarity direction. The two high-frequency duty-cycle switches $S_{HF}$ and $S'_{HF}$ operate alternately and at a frequency which is much higher than the operating frequency of the bridge switches. When switch $S_{HF}$ is closed, the capacitor is connected in series with the power source and the lamp, in the direction determined by the bridge switches. Conversely, when switch $S'_{HF}$ is closed, the capacitor is bypassed and the power source is connected to the lamp through only the filter inductor $L_f$.

Figure 6A:
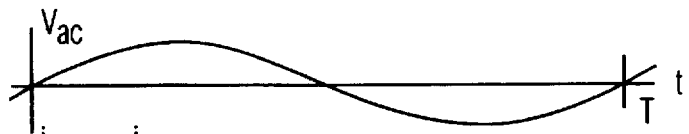
FIG. 6a–6f are waveform diagrams illustrating operation of the system of FIG. 5.
Figure 6B:
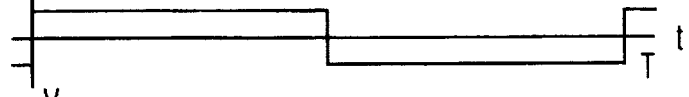
Figure 6C:
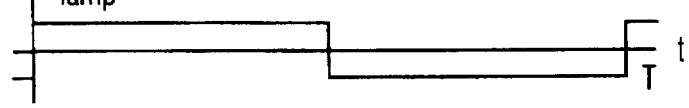
Figure 6D:
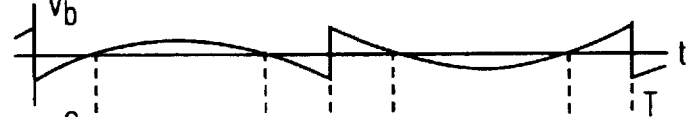
Figure 6E:
Figure 6F:
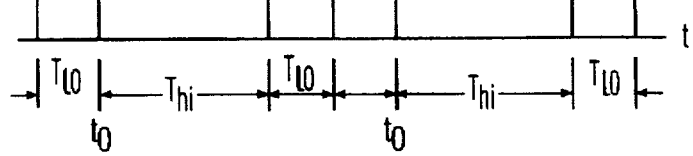

FIGS. 6a–6f illustrate the timing of operation of the bridge switches. Note that FIGS. 6a–6d are identical to FIGS. 3a–3d, which have already been explained. FIGS. 6e and 6f illustrate control pulses for closing the bridge switches $S_{BRp}$ and $S_{BRn}$, respectively. During periods $T_{hi}$, the magnitude of the power source voltage $v_{ac}$ is higher than the magnitude of the desired lamp operating voltage $v_{lamp}$ and the bridge switches connect the capacitor in series opposition with the power source, i.e. in the polarity for which the voltage $v_{Ce}$ on capacitor opposes the instantaneously-existing polarity of the voltage $v_{ac}$. Conversely, during periods $T_{lo}$, the magnitude of the voltage $v_{ac}$ is lower than the magnitude of the desired lamp operating voltage and the bridge switches connect the capacitor in series assistance with the power source, i.e. in the polarity for which the voltage $v_{Ce}$ assists the instantaneously-existing polarity of the voltage $v_{ac}$. Note that at the instant $t_O$ which begins each period $T_{hi}$, the capacitor $C_e$ may be completely discharged. This will happen automatically if the capacitor stores the energy $\frac{1}{2} E_{min}(sq)$ at the beginning of each half cycle.

The duty-cycle switches $S_{HF}$ and $S'_{HF}$ function to duty-cycle modulate the instantaneously-existing voltage $V_{Ce}$ on the capacitor $C_e$ to produce the ballast voltage $v_b$. These switches are operated alternately during each of successive periods $T_{HF}$ which occur at a very-high periodic rate (e.g. 100 kHz) relative to the periodic switching rate of the bridge switches, which typically switch through several (e.g. three) complete cycles during each complete cycle of the AC power source voltage. During each period $T_{HF}$ (e.g. 10 μsec), switch $S_{HF}$ closes for the duration $(D)T_{HF}$ and switch $S'_{HF}$ closes for the duration $(1-D)T_{HF}$, where $D=|v_b|/v_{Ce}$. Thus, for example, if the ballast voltage $v_b$ needed during a particular period $T_{HF}$ is 0.6 $v_{Ce}$, switch $S_{HF}$ will be closed for the duration $(0.6)T_{HF}$ and switch $S'_{HF}$ will be closed for the duration $(0.4)T_{HF}$. Note that the voltage drop across the filter inductor $L_f$ at the relatively low frequency of the voltage $v_b$ is considered to be substantially equal to zero. Note further that, although no specific circuitry is described for duty-cycle modulating the switches $S_{HF}$ and $S'_{HF}$ in response to variations between voltages $v_b$ and $V_{Ce}$, many suitable circuits are well known in the art. See, for example, Principles of Power Electronics by John G. Kassakian, Martin F. Schlecht & George C. Verghese, page 268, Addison-Wesley Publishing Company, 1991.

Figure 7:
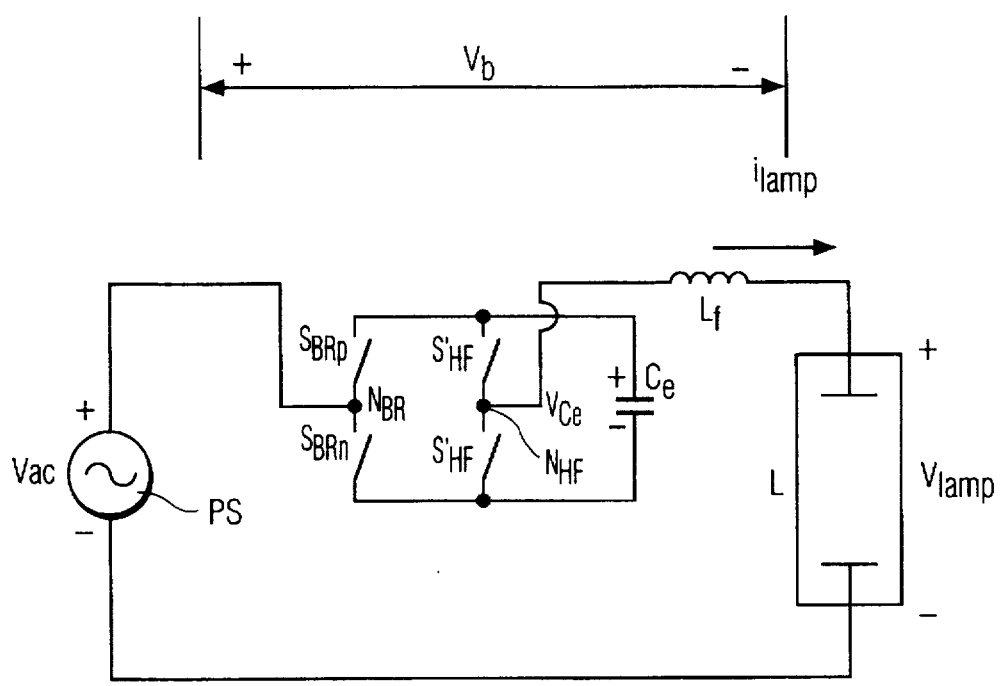
FIG. 7 is a schematic diagram of a discharge lamp system incorporating a second embodiment of an electronic ballast in accordance with the invention.

FIG. 7 shows a lamp system including a second embodiment of the series-capacitor electronic ballast $B_s$. This ballast is similar to the first embodiment, but utilizes two fewer bridge switches and thus has a lower overall switch resistance. However, it requires a more complicated switching sequence. The ballast includes a charge-storage capacitor $C_e$, a positive-direction bridge switch $S_{BRp}$, a negative-direction bridge switch $S_{BRn}$, two high-frequency duty-cycle switches $S_{HF}$ and $S'_{HF}$, and a filter inductor $L_f$. The capacitor $C_e$ always charges in the polarity shown in FIG. 7.

The bridge switches are electrically connected in series at a common node $N_{BR}$ which is shown as being electrically connected to the power source PS. Similarly, the high-frequency switches are electrically connected in series at a common node $N_{HF}$, which is shown as electrically connected to the lamp L through the inductor $L_f$. Alternatively, the ballast may be operated with node $N_{BR}$ electrically connected to the lamp and node $N_{HF}$ electrically connected to the power source.

The positive-direction bridge switch $S_{BRp}$ operates to connect the capacitor in the positive-polarity direction indicated in FIG. 2. The negative-direction bridge switch $S_{BRn}$ operates to connect the capacitor in the negative-polarity direction which is opposite to that indicated in FIG. 2. The two high-frequency duty-cycle switches $S_{HF}$ and $S'_{HF}$ form a bypass circuit and operate alternately and at a frequency which is much higher than the operating frequency of the bridge switches.

The function of each of the switches $S_{HF}$ and $S'_{HF}$ depends on which of the bridge switches is closed. When positive-direction bridge switch $S_{BRp}$ is closed, switch $S_{HF}$ connects the capacitor in series with the power source and the lamp and, alternately, switch $S'_{HF}$ bypasses the capacitor such that the power source is connected to the lamp through only the filter inductor $L_f$. Conversely, when negative-direction bridge switch $S_{BRn}$ is closed, switch $S'_{HF}$ connects the capacitor in series with the power source and the lamp and, alternately, switch $S_{HF}$ bypasses the capacitor such that the power source is connected to the lamp through only the filter inductor $L_f$.

Operation of the lamp system of FIG. 7 is also illustrated by FIGS. 6a–6f. Again FIGS. 6e and 6f illustrate control pulses for closing bridge switches $S_{BRp}$ and $S_{BRn}$, respectively. During periods $T_{hi}$, the magnitude of the power source voltage $v_{ac}$ is higher than the magnitude of the desired lamp operating voltage $v_{lamp}$ and the bridge switches connect the capacitor in series opposition with the power source. Conversely, during periods $T_{lo}$, the magnitude of the voltage $v_{ac}$ is lower than the magnitude of the desired lamp operating voltage and the bridge switches connect the capacitor in series assistance with the power source.

The duty-cycle switches $S_{HF}$ and $S'_{HF}$ again function to duty-cycle modulate the instantaneously-existing voltage $v_{Ce}$ on the capacitor $C_e$ to produce the ballast voltage $v_b$. These switches are operated alternately during each of successive periods $T_{HF}$ which occur at a very-high periodic rate relative to the operating frequency of the bridge switches. During each period $T_{HF}$ when bridge switch $S_{BRp}$ is in the closed state, switch $S_{HF}$ closes for the duration $(D)T_{HF}$ and switch $S'_{HF}$ closes for the duration $(1-D)T_{HF}$, where $D=|v_b|/v_{Ce}$. Conversely, during each period $T_{HF}$ when bridge switch $S_{BRn}$ is in the closed state, switch $S'_{HF}$ closes for the duration $(D)T_{HF}$ and switch $S_{HF}$ closes for the duration $(1-D)T_{HF}$.

Many variations of electronic ballast in accordance with the invention are possible. For example, the AC voltage $v_{ac}$ and current $i_{ac}$ supplied by the power source PS may be shifted out of phase with each other. This may be done by timing the operation of the bridge switches such that the square wave current and lamp voltage are shifted relative to the AC voltage by the angle $\alpha$. As the phase difference $\alpha$ between the AC voltage and current is increased, the magnitudes of the square-wave lamp current and voltage are decreased. This provides the capability of either controlling the phase shift $\alpha$ to dim the lamp or of driving a lamp rated for a voltage lower than that which is produced when $\alpha=0$. Such a phase shift would degrade the power factor at the power source, but note that the phase may be shifted either positively or negatively. This enables the power factor to be increased by powering two lamps, with respective ballasts, from the same power source, with the ballasts driving the lamps at equal magnitude but opposite polarity phase shifts.

We claim:

1. An electronic ballast for series electric connection between a discharge lamp and a power source, for supplying AC voltage and current at a predetermined operating frequency, to produce an instantaneously varying ballast voltage which, in combination with the AC voltage produced by the power source, supplies the lamp with an alternating square-wave voltage and current, having predetermined DC magnitudes, in synchronism with the AC voltage supplied by the power source, said ballast comprising:

a. capacitive storage means for alternately:
      i. storing electrical energy when the AC power source is instantaneously supplying more power than the lamp is consuming; and
      ii. supplying energy when the lamp is instantaneously consuming more power than the AC power source is supplying;

b. bridge switching means for alternately:
      i. connecting the capacitive storage means in series opposition with the AC power source when the instantaneous voltage supplied by said power source is higher than the predetermined square-wave voltage; and
      ii. connecting the capacitive storage means in series assistance with the AC power source when the instantaneous voltage supplied by said power source is lower than the predetermined square-wave voltage;

c. duty-cycle switching means for bypassing the capacitive storage means and placing the AC power source directly in series with the lamp during a fraction of each of successive periods occurring at a very high periodic rate relative to the predetermined operating frequency, said fraction being determined to produce an average ballast voltage over the respective period which effects production of the predetermined DC voltage magnitude during said period.

2. An electronic ballast as in claim 1 where the AC voltage supplied by the power source is sinusoidal.

3. An electronic ballast as in claim 1 where, over each half cycle of the AC voltage, the predetermined square-wave voltage is equal to the average magnitude of said AC voltage.

4. An electronic ballast as in claim 1 including a phase shifter for phase shifting the AC voltage relative to the AC current by the magnitude $\alpha$.

5. An electronic ballast as in claim 4 where the phase shifter is adapted to produce a fixed-magnitude phase shift.

6. An electronic ballast as in claim 4 where the phase shifter is adapted to produce a variable-magnitude phase shift.

7. An electronic ballast as in claim 1 where:
   a. the duty-cycle switching means comprises:
      i. a first high-frequency switch electrically connected in series with the capacitive storage means to form a series circuit; and
      ii. a second high-frequency switch electrically connected in parallel with the series circuit to form a parallel circuit;
   b. the bridge switching means comprises:
      i. first and second positive-direction bridge switches for electrically connecting the parallel circuit in series with the power source and the discharge lamp, respectively, in a positive-polarity direction when the instantaneous voltage supplied by said power source is higher than the predetermined square-wave voltage; and
      ii. first and second negative-direction bridge switches for electrically connecting the parallel circuit in series with the power source and the discharge lamp, respectively, in a negative-polarity direction when the instantaneous voltage supplied by said power source is lower than the predetermined square-wave voltage.

8. An electronic ballast as in claim 1 where:
   a. the duty-cycle switching means comprises alternately-actuable first and second high-frequency switches electrically connected in series with each other at a common first node to form a bypass circuit which is electrically connected in parallel with the capacitive storage means; and
   b. the bridge switching means comprises alternately-actuable first and second bridge switches electrically connected in series with each other at a common second node to form a bridge circuit which is electrically connected in parallel with the bypass circuit;

one of the first and second nodes being provided for electrical connection to the power source and the other one of the first and second nodes being provided for electrical connection to the discharge lamp.

* * * * *